US011365840B2

(12) United States Patent
Gauthier

(10) Patent No.: US 11,365,840 B2
(45) Date of Patent: Jun. 21, 2022

(54) CODE VERIFICATION SLEEVE FOR A QUICK CONNECTOR

(71) Applicant: A Raymond et Cie, Grenoble (FR)

(72) Inventor: Justin Gauthier, Shelby Township, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 16/953,539

(22) Filed: Nov. 20, 2020

(65) Prior Publication Data

US 2022/0163153 A1     May 26, 2022

(51) Int. Cl.
*F16L 37/12*     (2006.01)

(52) U.S. Cl.
CPC ....... *F16L 37/1225* (2013.01); *F16L 2201/10* (2013.01)

(58) Field of Classification Search
CPC ... F16L 37/0841; F16L 37/1225; F16L 37/12; F16L 37/133; F16L 37/144; F16L 37/148; F16L 2201/10; F16L 2201/60
USPC ............................... 285/86, 84, 85, 93, 319
See application file for complete search history.

(56) References Cited

U.S. PATENT DOCUMENTS

| | | |
|---|---|---|
| 7,578,529 B2 | 8/2009 | Lutzke et al. |
| 8,944,473 B2 | 2/2015 | Lutzke et al. |
| 9,115,834 B2 | 8/2015 | Parks et al. |
| 9,851,035 B2 | 12/2017 | Hunt et al. |
| 2008/0231045 A1* | 9/2008 | Trede .................... F16L 37/144 285/93 |
| 2012/0211974 A1* | 8/2012 | Richardson ............ A62C 33/00 285/93 |
| 2013/0307263 A1 | 11/2013 | Parks et al. |

(Continued)

FOREIGN PATENT DOCUMENTS

| | | |
|---|---|---|
| DE | 102009043088 B3 | 3/2011 |
| DE | 202020103903 U1 | 7/2020 |
| EP | 3736481 A1 | 11/2020 |

(Continued)

OTHER PUBLICATIONS

Machine assisted English translation of DE202020103903U1 obtained from https://patents.google.com/patent on Aug. 2, 2021, 8 pages.

(Continued)

*Primary Examiner* — Aaron M Dunwoody
(74) *Attorney, Agent, or Firm* — Warner Norcross + Judd LLP

(57) ABSTRACT

An improved quick connector with code verification is provided. The quick connector includes a connector body, a connector sleeve, and a sliding lock latch. The connector body includes a verification indicia on its outer surface, and the connector sleeve is movable over the connector body and includes an indicator window that aligns with the verification indicia. The sliding lock latch is moveable from an unlatched position to a latched position through transverse openings in the connector sleeve and the connector body. The sliding lock latch includes first and second wing elements to prevent clockwise and counter-clockwise rotation of the connector sleeve relative to the connector body. The sliding lock latch also includes a locking tab on its outer surface to prevent retraction of the connector sleeve from the connector body.

19 Claims, 10 Drawing Sheets

(56) References Cited

U.S. PATENT DOCUMENTS

2019/0040982 A1    2/2019   Cantrell et al.

FOREIGN PATENT DOCUMENTS

| WO | 2003095884 A1 | 11/2003 |
| WO | 2016081560 A1 | 5/2016 |
| WO | 2017007567 A1 | 1/2017 |
| WO | 2018102213 A1 | 6/2018 |
| WO | 2020099454 A1 | 5/2020 |

OTHER PUBLICATIONS

Machine assisted English translation of DE102009043088B3 obtained from https://worldwide.espacenet.com on Feb. 25, 2021, 11 pages.
Machine assisted English translation of WO2020099454A1 obtained from https://worldwide.espacenet.com on Feb. 25, 2021, 23 pages.

* cited by examiner

CODE VERIFICATION SLEEVE FOR A QUICK CONNECTOR

FIELD OF THE INVENTION

The present invention relates to connector assemblies to join fluid lines together, and in particular, connector assemblies providing machine readable connection verification.

BACKGROUND OF THE INVENTION

Quick connectors are commonly used to join fluid lines together in vehicle applications, including for example fuel lines, brake lines, and coolant lines. Tactile and audible confirmations have long been employed to ensure a reliable connection between quick connectors and fluid lines. More recently, quick connectors can provide a visual confirmation of a reliable connection. Examples include color markings and machine readable code that only become visible upon full engagement between the quick connector and a fluid line.

In some applications, a printed verification indicia is viewable through a window or a cutout portion of a quick connector. For example, a first component of a quick connector can include a verification indicia, and a second component of a quick connector can include a window for viewing the verification indicia, either manually or electro-optically. Obstruction-free viewing of the verification indicia requires proper alignment of the first component relative to the second component upon engagement with the fluid line, such that the verification indicia aligns with the window. However, in some applications, the verification indicia can become skewed relative to the window, making the verification indicia difficult or impossible to read.

Accordingly, there remains a continued need for an improved quick connector that overcomes these and other shortcomings, and in particular, a quick connector with a robust and substantially error-free verification indicia for use in automotive and other applications.

SUMMARY OF THE INVENTION

An improved quick connector with code verification is provided. The quick connector includes a connector body, a connector sleeve, and a sliding lock latch. The connector body includes a verification indicia on its outer surface, and the connector sleeve fits over the connector body and includes an indicator window that aligns with the verification indicia. The sliding lock latch is moveable from an unlatched position to a latched position through transverse openings in the connector sleeve and the connector body. The sliding lock latch includes first and second wing elements to prevent clockwise and counter-clockwise rotation of the connector sleeve relative to the connector body. The sliding lock latch also includes a locking tab on its outer surface to prevent retraction of the connector sleeve from the connector body.

In one embodiment, the connector body includes a fluid input end and a fluid output end. The fluid input end includes a transverse opening for receiving the sliding lock latch. The verification indicia is visible on an outer surface of the connector body proximate the fluid input end. The verification indicia can be a machine readable printed label, optionally as a Quick Response (QR) code or a bar code, while in other embodiments the verification indicia is not machine readable and instead includes a discernable color or pattern for example. The connector sleeve is movable axially over the connector body and includes a cylindrical sidewall defining a latch window in alignment with the transverse opening in the connector body.

In another embodiment, the sliding lock latch is moveable from an unlatched position to a latched position through the latch window in the connector sleeve and the transverse opening in the connector body. In the unlatched position, the connector sleeve is in a first axial position and the verification indicia is concealed from view. In the latched position, the connector sleeve can be moved to a second axial position in which the verification indicia is visible through an indicator window. When in the latched position, the wing elements prevent rotation of the connector sleeve relative to the connector body, and the locking tab prevents the connector sleeve from accidentally retracting from the connector body.

The improved quick connector of these and other embodiments can ensure proper alignment of a verification indicia through an indicator window to minimize leaks and installation failures. Instead of relying solely on the hoop strength of the connector sleeve to maintain the indicator window in alignment with the verification indicia, the improved quick connector includes a sliding lock latch having wing elements and a locking tab. The improved quick connector is coupled to a quick connect fitting in a three-step process as with earlier constructions, providing an intuitive new construction that can be used for a range of applications, including for example the connection of fuel lines, brake lines, and coolant lines.

These and other features and advantages of the present invention will become apparent from the following description of the invention, when viewed in accordance with the accompanying drawings and appended claims.

DETAILED DESCRIPTION OF THE CURRENT EMBODIMENT

Figure 1:
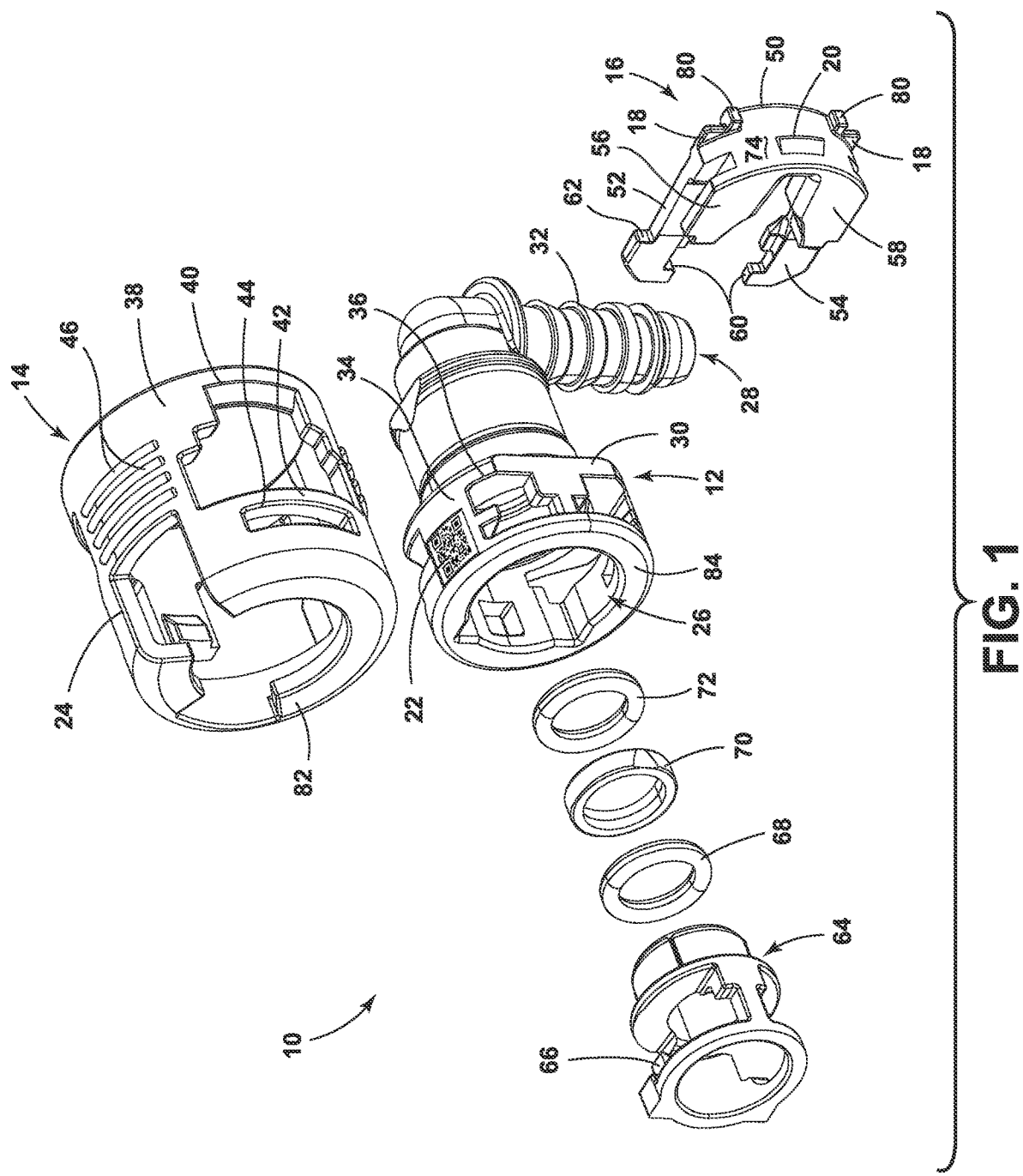
FIG. 1 is an exploded view of a quick connector in accordance with a first embodiment of the present invention.

Referring to FIGS. 1-6, a quick connector in accordance with a first embodiment is illustrated and generally designated 10. The quick connector 10 includes a connector body 12, a connector sleeve 14, and a sliding lock latch 16. The sliding lock latch 16 includes first and second wing elements 18 and a locking tab 20 to prevent misalignment of a verification indicia 22 with an indicator window 24. Each feature is discussed below. Though described in connection with fuel lines, the quick connector 10 can be used in other applications as desired, including the connection of brake lines and coolant lines for example.

As shown in FIG. 1, the connector body 12 defines a fluid passage between a fluid input end 26 and a fluid output end 28. The connector body 12 further includes a connector collar 30 at the fluid input end 26 and a barbed stem 32 and the fluid output end 28. The connector body 12 comprises an elbow fitting in the current embodiment, such that the fluid passage includes an approximately ninety-degree bend between the fluid input end 26 and the fluid output end 28. In other embodiments the connector body 12 comprises a straight coupling between two fluid lines. The connector body 12 can be formed from any suitable material, optionally a durable, chemical-resistant and lightweight polymerized material.

As also shown in FIG. 1, the connector collar 30 includes a cylindrical sidewall 34 that defines a transverse opening 36 and that bears a verification indicia 22. The transverse opening 36 is shaped to receive the sliding lock latch 16 in a manner described below. The verification indicia 22 includes a visual cue to indicate the connector sleeve 14 is fully seated over the connector collar 30. The verification indicia 22 includes a machine readable printed label, optionally a QR code or a bar code, while in other embodiments the verification indicia 22 is not machine readable and instead includes a color, a pattern, an icon, or other feature to indicate to a user that the connector sleeve 14 is fully seated over the connector collar 30. The verification indicia 22 is generally angularly offset from the transverse opening 36, optionally by between 60 degrees and 120-degrees, further optionally about 90-degrees.

The connector sleeve 14, like the connector body 12, includes a cylindrical sidewall 38. The cylindrical sidewall 38 defines an indicator window 24, a sliding lock latch window 40, and a locking tab window 42. The indicator window 24 includes a three-sided rectangular cut-out in in the illustrated embodiment, such that the indicator window 24 frames the verification indicia 22 on three sides thereof. In other embodiments the indicator window 24 is self-enclosed and frames the verification indicia 22 on four sides thereof. The sliding lock latch window 40 and the locking tab window 42 are entirely enclosed within the cylindrical sidewall 38, being separated by a latching arm 44. The latching arm 44 is a point of engagement for the locking tab 20 when the connector sleeve 14 is fully seated. The sliding lock latch window 40 and the locking tab window 42 are in axial alignment with each other, while the indicator window 24 is angularly offset from the sliding lock latch window 40 and the locking tab window 42 by between 60-degrees and 120-degrees, further optionally about 90-degrees. The sidewall 38 can include additional raised features, for example lateral ribs 46, to provide an additional friction point for manual movement of the connector sleeve 14.

The sliding lock latch 16 includes a base portion 50, first and second latching arms 52, 54 and first and second interference abutments 56, 58. The first and second latching arms 52, 54 extend from the base portion 50 and include a distal end portion having a blocker tab 60 and a retention hook 62. The blocker tabs 60 engage a lock washer 64 when the sliding lock latch 16 is in the unlocked position. To arrive at the locked position, the latching arms 52, 54 deflect axially rearward, extending past an interference portion 66 of the lock washer 64. When in the latched position, the retention hooks 62 prevent removal of the sliding lock latch 16 from the sliding lock latch window 36. The first and second interference abutments 56, 58 function to more securely engage a fluid line when held in position by the sliding lock latch 16 and prevent the insertion of the fluid line if the sliding lock latch 16 is moved into its locking position before the fluid line has been fully inserted in the fluid input end 26 of the connector body 12.

Figure 2:
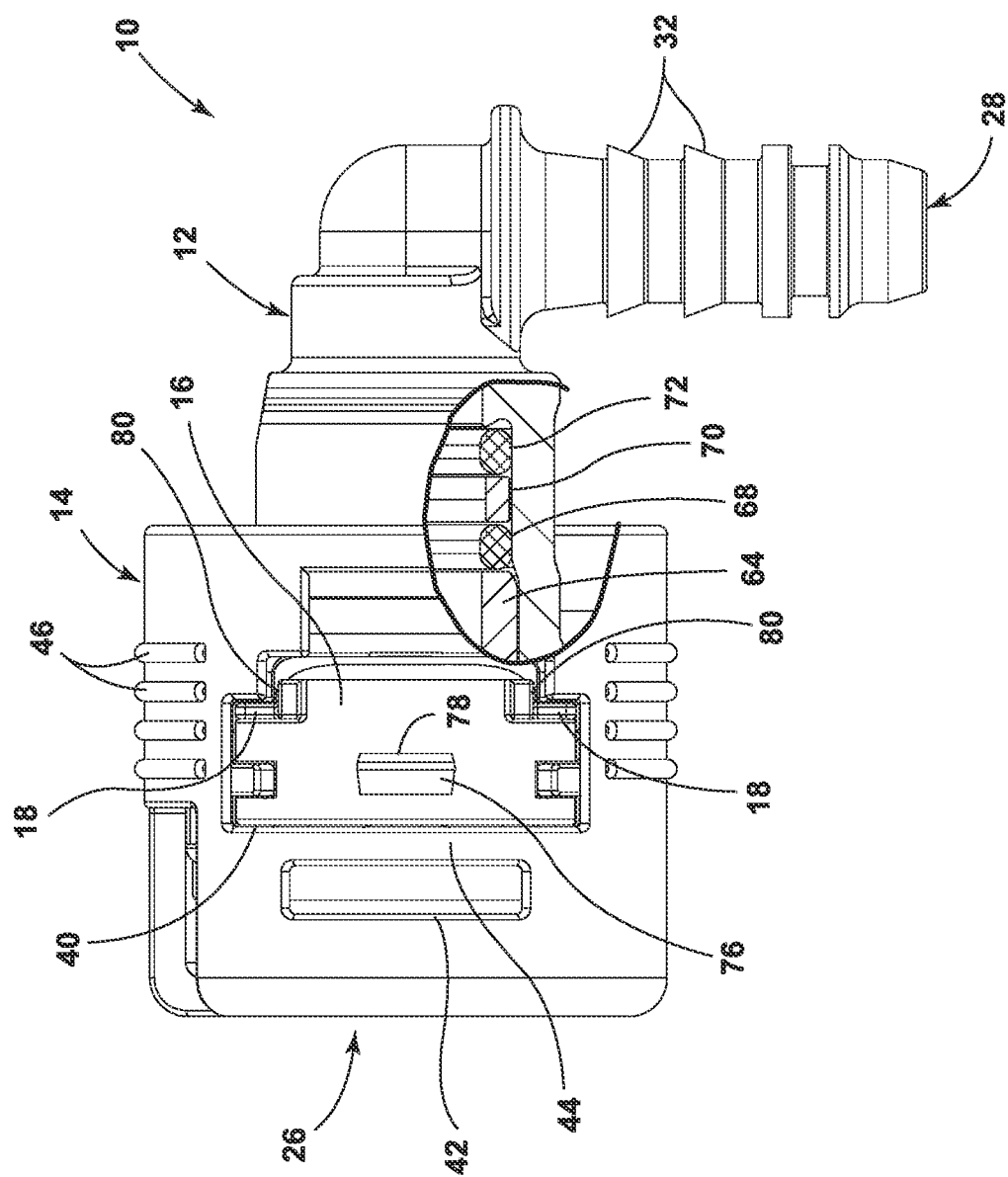
FIG. 2 is a first side view of the quick connector of FIG. 1.
Figure 3:
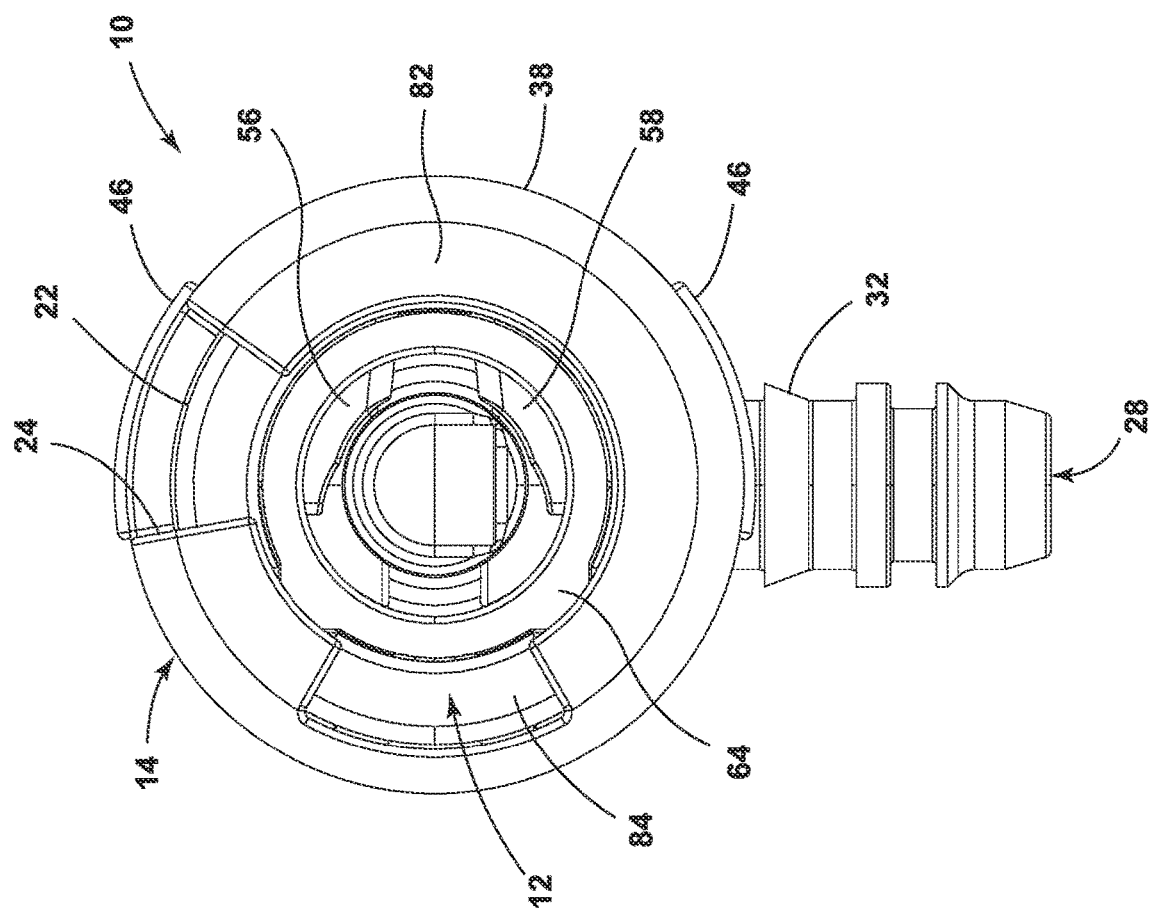
FIG. 3 is a second side view of the quick connector of FIG. 1.

As additionally shown in FIG. 1 and in cross-section in FIG. 2, the quick connector 10 includes a primary O-ring 68, a secondary O-ring 72, and a spacer 70 positioned between the primary O-ring 68 and the secondary O-ring 72. These sealing members function to prevent leakage of fluid, for example fuel, from the coupling between the quick connector 10 and a fluid line. The primary and secondary O-rings 68, 72 are generally selected to be chemically resistant. The primary O-ring 68 is compressed against spacer 70 by the lock washer 64, and the secondary O-ring 72 is compressed against a portion of the connector body 12 by the spacer 70.

As also shown in FIG. 1, the base portion 50 of the sliding lock latch 16 includes a curved outer surface 74 that generally conforms to the cylindrical sidewall 34 of the connector body 12. The above-noted locking tab 20 is centrally positioned on the base portion 20, having a first ramped surface 76 and a second ramped surface 78 that intersect along an edge. The first ramped surface 76 includes a steeper pitch than the second ramped surface 78, and the second ramped surface 78 engages the latching arm 44 when the sliding lock latch 16 is fully inserted and the connector sleeve 14 is fully seated. The first and second wings elements 18 protrude outwardly from the curved outer surface 74 of the base portion 16. Each wing element 18 comprises a corner projection extending in a plane that is orthogonal to the central axis of the fluid input end 26, with each corner projection including two converging sides that meet at an approximately 90° angle. Vertical posts 80 are adjacent each wing element 18. The vertical posts 80 absorb at least a portion of the downward pressure to prevent breakage of the wing elements 18. The sliding lock latch window 40 includes a stepwise reduction in side-to-side width (shown in FIG. 4). At its widest point, the sliding lock latch window 40 includes a width equal to the distance separating the outermost portions of the first and second wings elements 18. This width reduces to the distance separating the outermost portions of the vertical posts 80.

Figure 4:
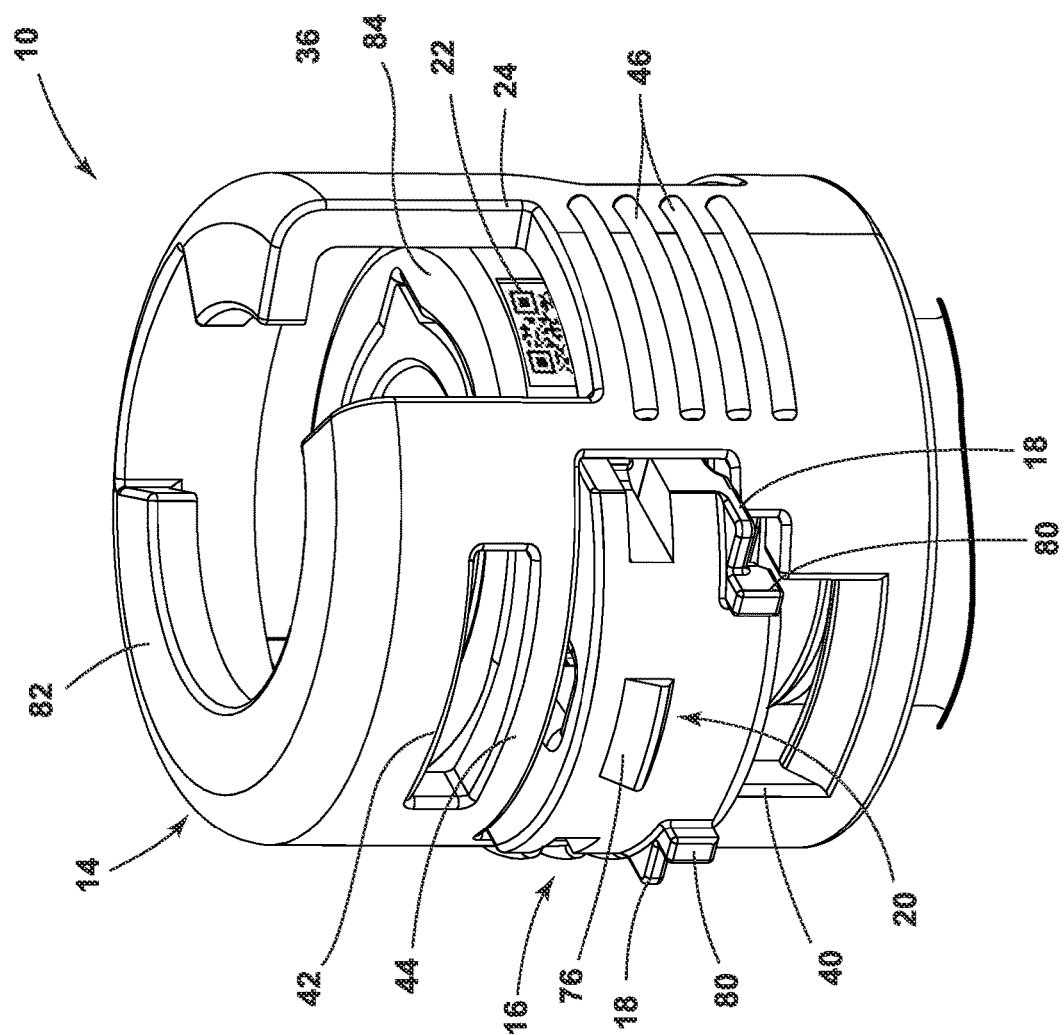
FIG. 4 is a first view of a connector body partially within a connector sleeve.
Figure 5:
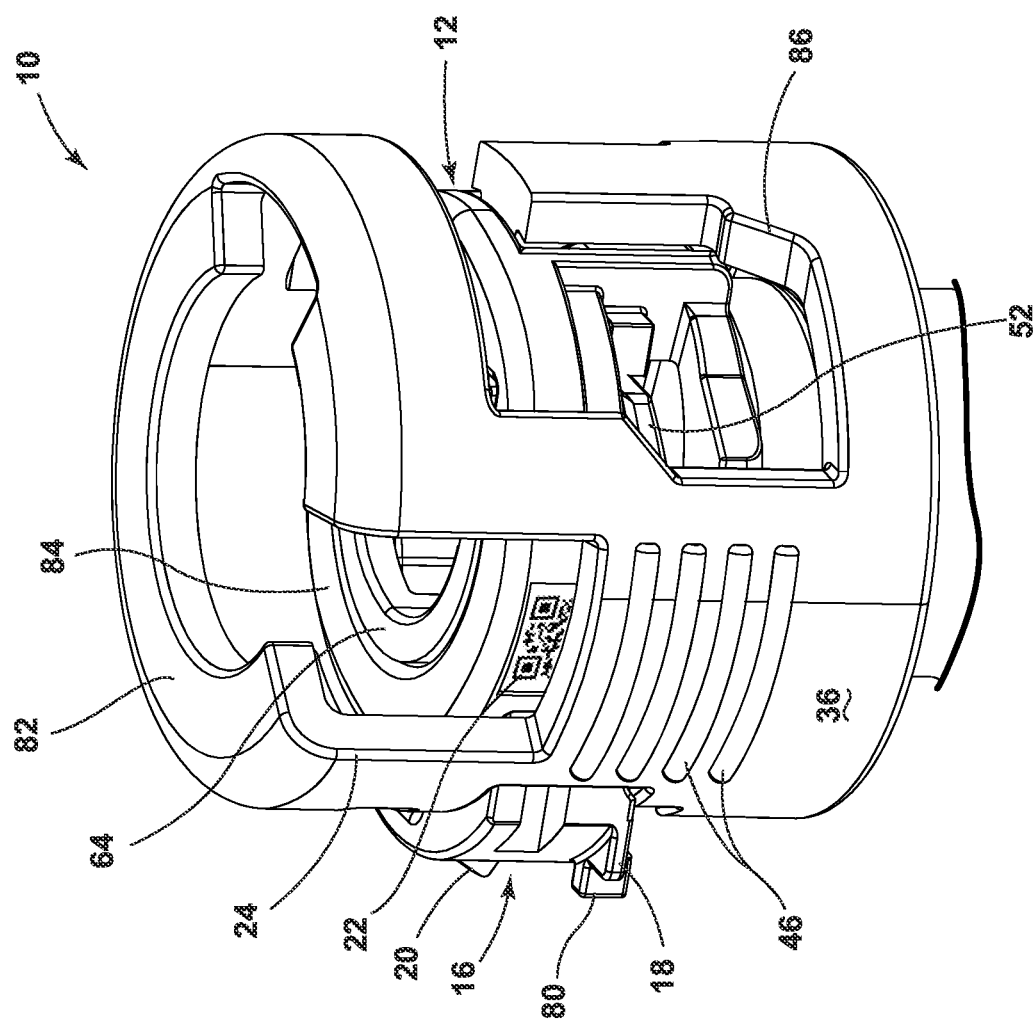
FIG. 5 is a second view of a connector body partially within a connector sleeve.

Operation of the quick connector will now be described with reference to FIGS. 4-6. Referring first to FIGS. 4 and 5, the connector sleeve 14 is shown in the raised position and the sliding lock latch 16 is shown in the unlatched (retracted) position. When in the raised position, the connector sleeve 14 includes an annular rim 82 that is spaced apart from an upward facing surface 84 of the connector body 12, and the verification indicia 22 is only partially in view. When in the unlatched (retracted) position, the sliding lock latch 16 physically obstructs the connector sleeve 14, preventing it from being lowered onto the connector body 12. The opposite side of the connector sleeve 14, distal from the sliding lock latch 16, includes an enlarged opening 86, through which the first and second latching arms 52, 54 are visible.

Figure 6:
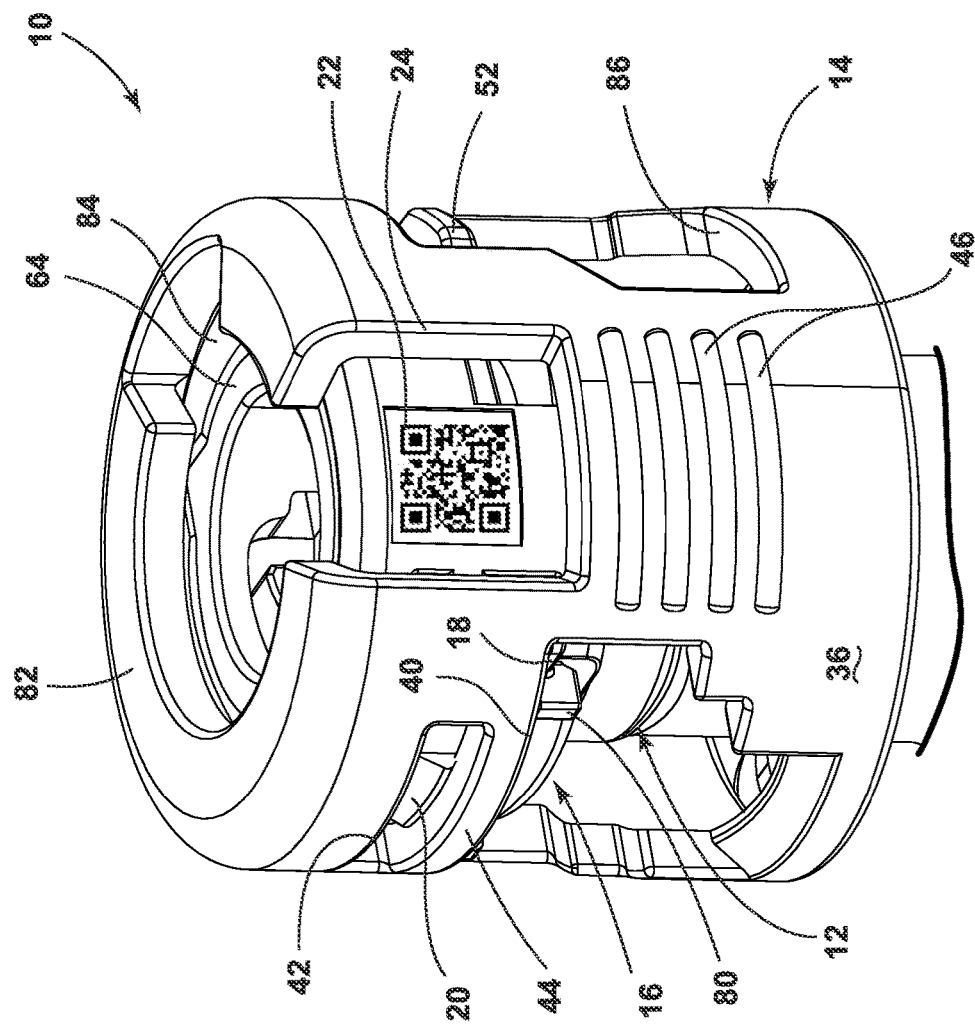
FIG. 6 is a view of the quick connector illustrating the connector body fully seated within the connector sleeve.
Figure 7:
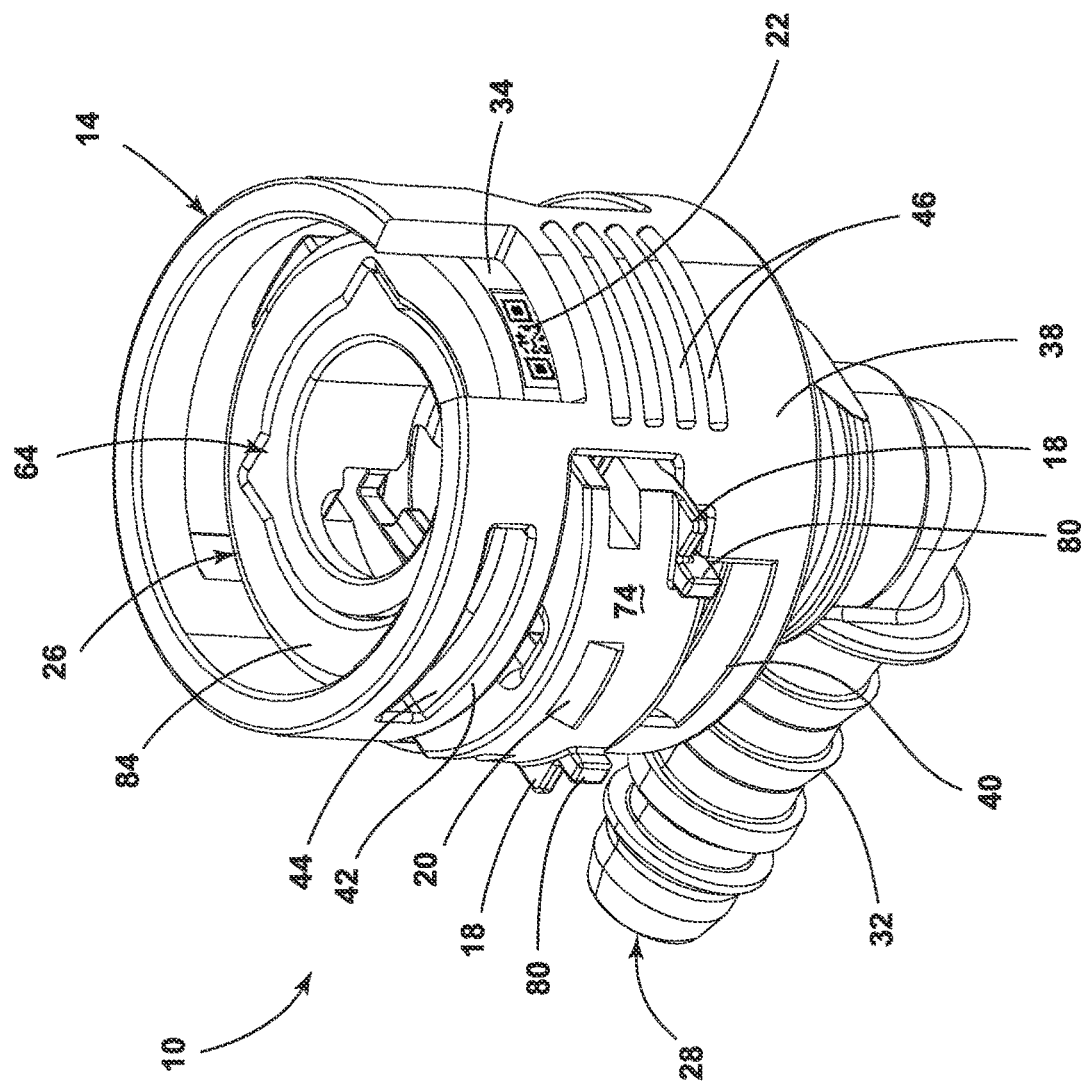
FIG. 7 is a perspective view of a quick connector in accordance with a second embodiment of the invention.
Figure 8:
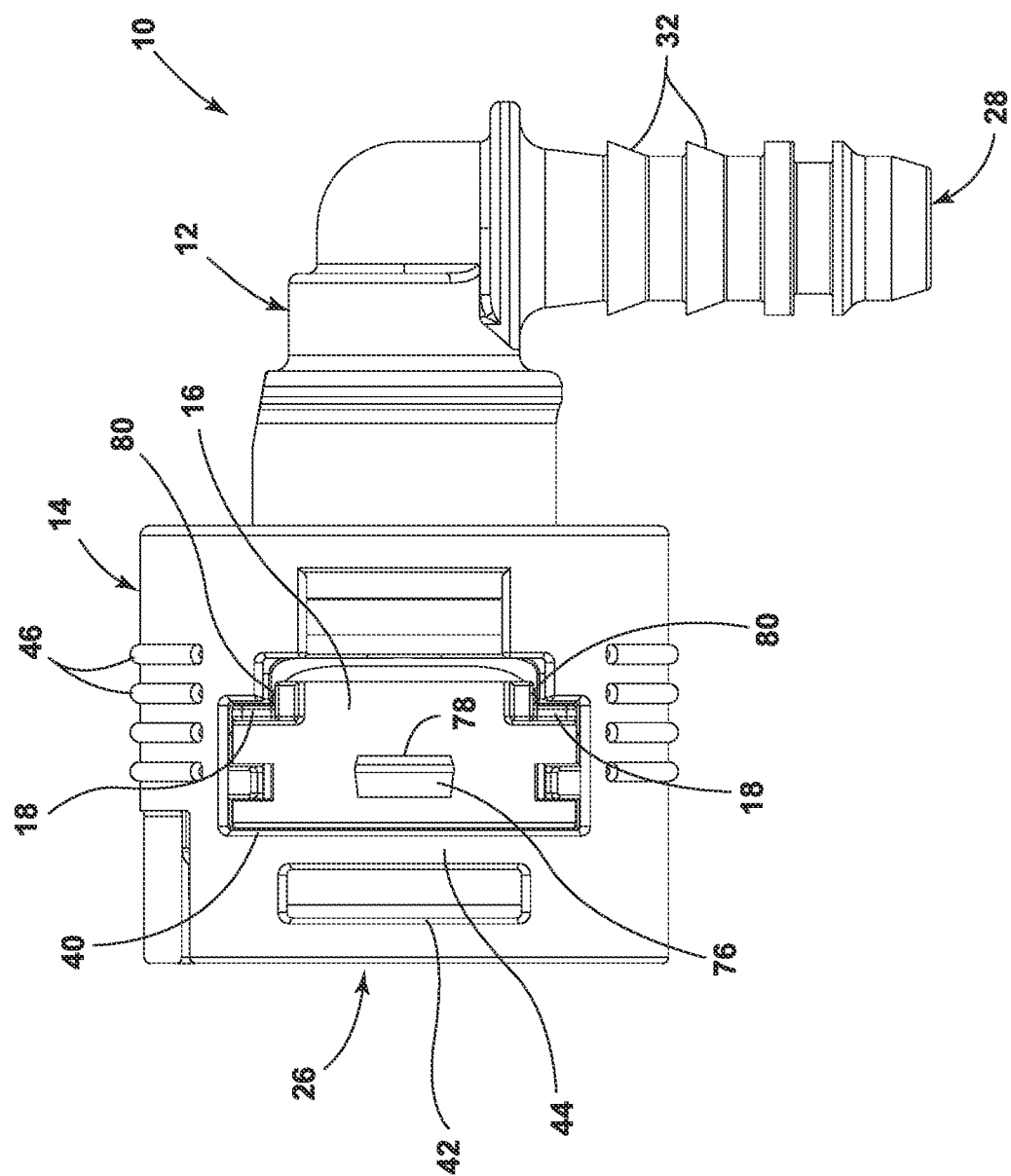
FIG. 8 is a first side view of the quick connector of FIG. 7.
Figure 9:
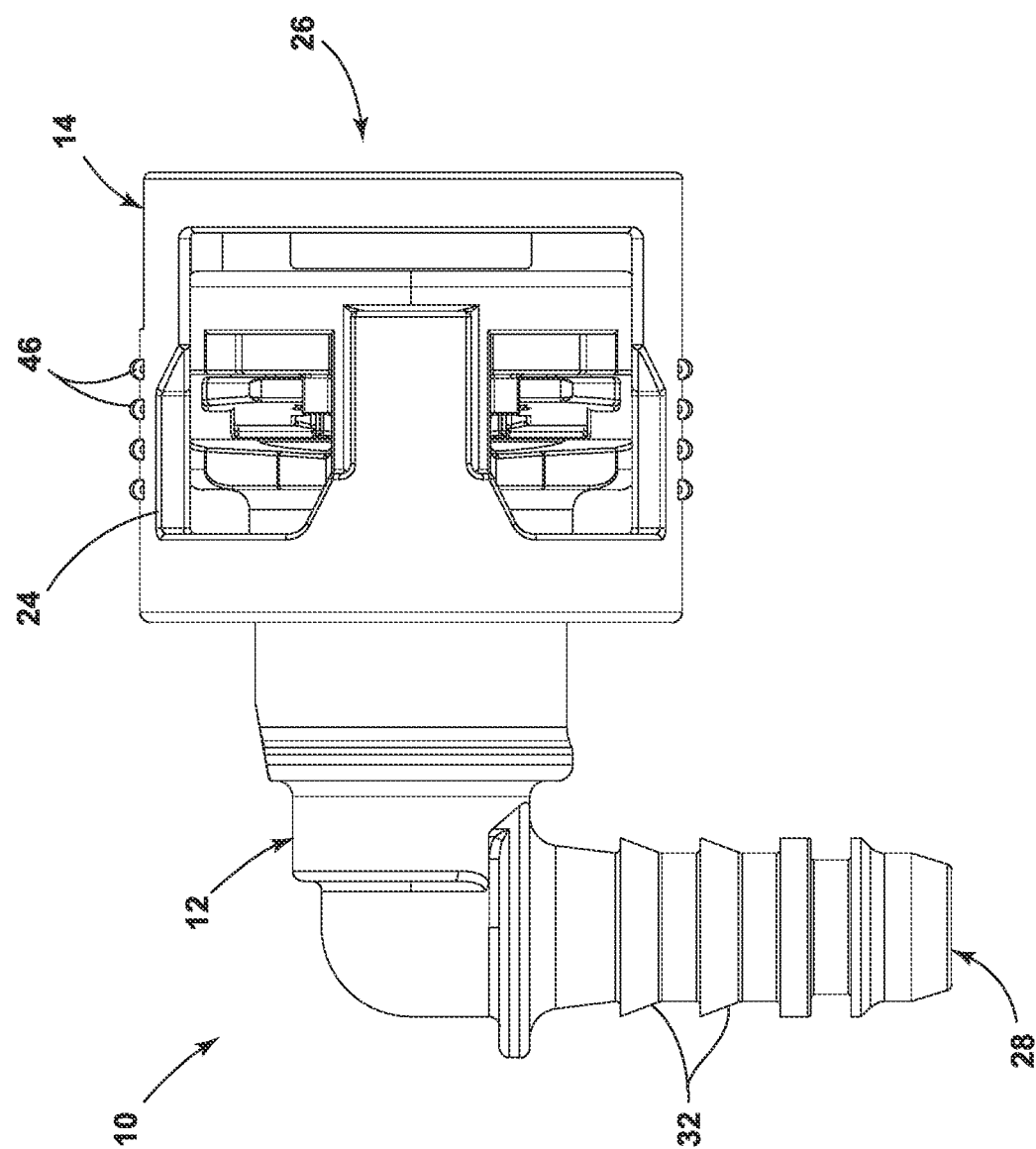
FIG. 9 is a second side view of the quick connector of FIG. 7.
Figure 10:
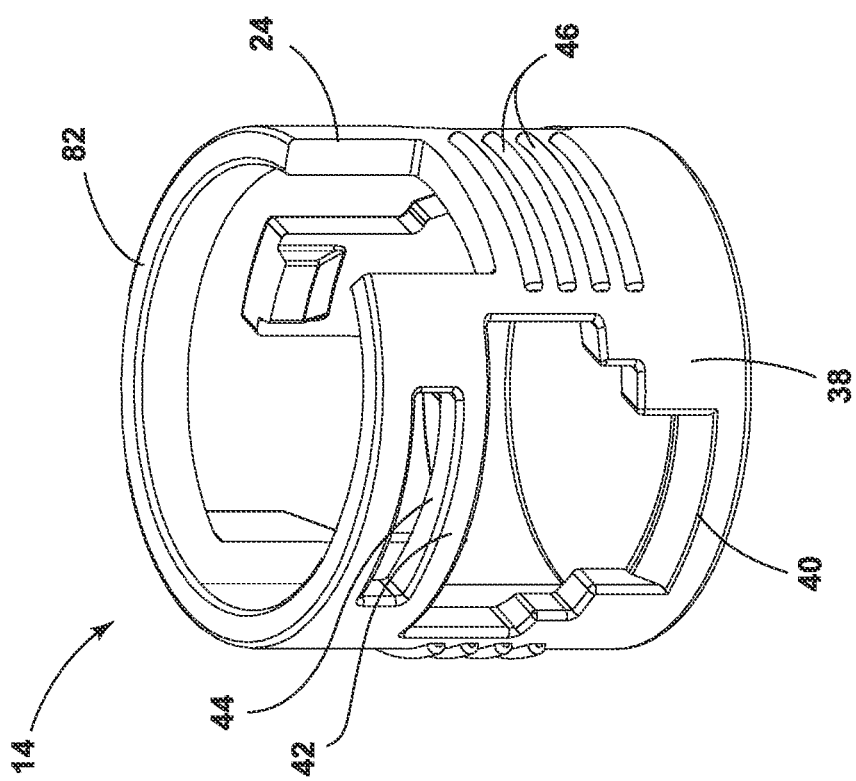
FIG. 10 is a perspective view of a connector sleeve for the quick connector of FIG. 7.

FIG. 6 depicts the sliding lock latch 16 in the latched (inserted) position and depicts the connector sleeve 14 in the lowered position. The verification indicia 22 is in complete alignment with the indicator window 24, providing machine readable visual confirmation of a secure connection between a fluid line and the first input end of the connector body 12. To arrive in this position, the user inserts a fluid line in compliance with SAE J2044, or other standard, into the fluid input end 26 of the connector body 12 until the lock washer 64 is fully seated against the primary O-ring 68, spacer 70, and secondary O-ring 72. The user then slides the sliding lock latch 16 laterally until the curved outer surface 74 of the sliding lock latch 16 is flush with the cylindrical sidewall 34 of the connector body 12, at which point the retention hooks 62 prevent removal of the sliding lock latch 16 from the sliding lock latch window 36. The user then depresses the connector sleeve 14 into the connector body 12 until the locking tab 20 of the sliding lock latch 16 engages the latching arm 44 of the connector sleeve 14. In this position, as shown in FIG. 6, the verification indicia 22 is visible through the indicator window 24. The locking tab 20 prevents accidental removal of the connector sleeve 14 from the connector body 12. In addition, wing elements 18 prevent accidental rotation of the connector sleeve 14 relative to the connector body 12. As a result, the sliding lock latch 16 ensures proper alignment of the verification indicia 22 through the connector sleeve indicator window 24.

Referring now to FIGS. 7-10, a quick connector in accordance with a second embodiment is illustrated. The quick connector of this embodiment includes a shortened connector sleeve 14, and the quick connector sleeve 14 includes a flat upper surface 82 that does not protrude inwardly, as in the embodiment of FIGS. 1-6. The indicator window 24 is likewise shortened, and is defined on three sides thereof as a cutout portion of the connector sleeve 14. As in the embodiment of FIGS. 1-6, the sliding lock latch window 40 and the locking tab window 42 are entirely enclosed within the cylindrical sidewall 38, being separated by a latching arm 44, which serves as a point of engagement for the locking tab 20 when the connector sleeve 14 is fully seated. The connector sleeve 14 includes a resilient locking tab 88 opposite of the sliding lock latch window 40 and the locking tab window 42, the resilient locking tab 88 securing the connector sleeve 14 in the raised position during shipment and prior to assembly. The connector body 12 and the sliding lock latch 16 are substantively identical to the embodiment of FIGS. 1-6. In particular, the connector body 12 includes a connector collar 30 at the fluid input end 26 and a barbed stem 32 and the fluid output end 28. The sliding lock latch 16 includes a base portion 50, first and second latching arms 52, 54 and first and second interference abutments 56, 58. The base portion 50 further includes the above-noted includes first and second wing elements 18 and a locking tab 20 to prevent misalignment of a verification indicia 22 with an indicator window 24.

To reiterate, the quick connector 10 of the above embodiments provide code verification in an intuitive, three-step process. First, the male end of a SAE J2044 quick connect fitting (or other fitting) is inserted into the fluid input end 26 of the connector body 12. Second, the sliding lock latch 16 is moved from its un-latched position to its latched position, being fully seated within the transverse opening in the connector body 12 to prevent accidental withdrawal of the quick connector 10. Third, the connector sleeve 14 is lowered onto the connector body 12 until the locking tab 20 of the sliding lock latch 16 engages the latching arm 44 of the connector sleeve 14 (preventing its withdrawal) and the annular rim 82 of the connector sleeve 14 rests against the upward facing surface 84 of the connector body 12. The verification indicia 22 is visible through the indicator window 24, providing visual confirmation of a secure coupling, in addition to tactile and audible confirmation associated with the sliding lock latch 16 engaging the quick connect fitting and the connector sleeve 14 engaging the sliding lock latch 16.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A quick connector comprising:
   a connector body including a collar for receiving a fluid line, the collar bearing a verification indicia on an outer surface thereof and defining a transverse opening;
   a connector sleeve that is movable axially over collar from a retracted position to a seated position, the connector sleeve at least partially defining an indicator window; and
   a sliding lock latch including a base portion and first and second latching arms, the base portion including first and second wing elements projecting outwardly therefrom, the first and second wing elements comprising corner projections that extend radially outward from the base portion of the sliding lock latch, the sliding lock latch being moveable from an unlatched position to a latched position,
   wherein, in the unlatched position, the sliding lock latch partially protrudes from the transverse opening and prevents movement of the connector sleeve to the seated position, and
   wherein, in the latched position, the sliding lock latch is fully inserted into the transverse opening to allow movement of the connector sleeve to the seated position, the first and second wing elements preventing rotation of the connector sleeve relative to the connector body.

2. The quick connector of claim 1 wherein the verification indicia is visible through the indicator window when the connector sleeve is in the seated position.

3. The quick connector of claim 1 wherein the verification indicia is machine readable and includes a Quick Response (QR) code or a bar code.

4. The quick connector of claim 1 wherein the sliding lock latch further includes first and second vertical posts adjacent the first and second wing elements.

5. The quick connector of claim 1 further including a locking tab extending from the base portion of the sliding lock latch.

6. The quick connector of claim 5 wherein the connector sleeve further defines a locking tab window for the locking tab when the connector sleeve is in the seated position.

7. The quick connector of claim 6 wherein the connector sleeve further defines a sliding lock latch window for the sliding lock latch when the sliding lock latch is unlatched.

8. The quick connector of claim 7 wherein the indicator window is angularly offset from the locking tab window and the sliding lock latch window.

9. The quick connector of claim 1 wherein the indicator window is defined on three sides thereof as a cutout portion of the connector sleeve.

10. A quick connector comprising:
a connector body defining a fluid passage between a fluid input end and a fluid output end, the connector body bearing a verification indicia on an outer surface thereof and defining a transverse opening proximate the fluid input end;
a connector sleeve that is movable axially over the fluid input end of the connector body from a first axial position to a second axial position, the connector sleeve including a cylindrical sidewall defining and an indicator window;
a sliding lock latch that is moveable from an unlatched position to a latched position through the transverse opening in the connector body, wherein, in the unlatched position, the connector sleeve is in the first axial position such that the verification indicia is at least partially concealed from view, and in the latched position, the connector sleeve can be moved to the second axial position such that the verification indicia is viewable through the indicator window, the sliding lock latch including first and second wing elements extending radially outward therefrom, the first and second wing elements preventing rotation of the connector sleeve relative to the connector body when the sliding lock latch is in the latched position.

11. The quick connector of claim 10 wherein the sliding lock latch includes a base portion and first and second latching arms.

12. The quick connector of claim 11 wherein the first and second wing elements comprise corner projections that extend radially from the base portion of the sliding lock latch.

13. The quick connector of claim 11 further including a locking tab extending from the base portion of the of the sliding lock latch.

14. The quick connector of claim 13 wherein the connector sleeve further defines a locking tab window for the locking tab when the connector sleeve is in the second axial position.

15. The quick connector of claim 10 wherein the sliding lock latch further includes first and second vertical posts adjacent the first and second wing elements.

16. The quick connector of claim 10 wherein the connector sleeve further defines a sliding lock latch window that is angularly offset from the indicator window.

17. The quick connector of claim 10 wherein the verification indicia is machine readable and includes a Quick Response (QR) code or a bar code.

18. The quick connector of claim 10 wherein the verification indicia includes a visual feature indicating a secure coupling to the connector body.

19. The quick connector of claim 10 further including a lock washer, first and second O-rings, and a spacer within the connector body.

* * * * *